(12) United States Patent
Haga

(10) Patent No.: US 10,078,548 B2
(45) Date of Patent: Sep. 18, 2018

(54) MEMORY CONTROLLER, SEMICONDUCTOR DEVICE AND METHOD OF CONTROLLING SEMICONDUCTOR DEVICE

(71) Applicant: Toshiba Memory Corporation, Minato-ku (JP)

(72) Inventor: Takuya Haga, Yokohama (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 297 days.

(21) Appl. No.: 15/047,080

(22) Filed: Feb. 18, 2016

(65) Prior Publication Data

US 2017/0075579 A1    Mar. 16, 2017

Related U.S. Application Data

(60) Provisional application No. 62/217,348, filed on Sep. 11, 2015.

(51) Int. Cl.
| | |
|---|---|
| *G06F 12/00* | (2006.01) |
| *G06F 11/10* | (2006.01) |
| *G06F 3/06* | (2006.01) |
| *G06F 12/02* | (2006.01) |

(52) U.S. Cl.
CPC .......... *G06F 11/1068* (2013.01); *G06F 3/061* (2013.01); *G06F 3/064* (2013.01); *G06F 3/0613* (2013.01); *G06F 3/0619* (2013.01); *G06F 11/1048* (2013.01); *G06F 12/0246* (2013.01)

(58) Field of Classification Search
CPC ............ G06F 11/1068; G06F 11/1048; G06F 12/0246; G06F 3/061; G06F 3/0619; G06F 3/064; G06F 3/0613

See application file for complete search history.

(56) References Cited

U.S. PATENT DOCUMENTS

| | | | |
|---|---|---|---|
| 7,589,997 B2 | 9/2009 | Honma et al. | |
| 8,331,147 B2 | 12/2012 | Shiga | |
| 8,984,375 B2 | 3/2015 | Hashimoto | |
| 2008/0094899 A1* | 4/2008 | Honma | G06F 11/1068 |
| | | | 365/185.09 |
| 2016/0049201 A1* | 2/2016 | Lue | G11C 16/0483 |
| | | | 365/185.11 |

FOREIGN PATENT DOCUMENTS

| | | |
|---|---|---|
| JP | 2008-108297 | 5/2008 |
| JP | 2011-44200 | 3/2011 |
| JP | 2013-125527 | 6/2013 |

* cited by examiner

*Primary Examiner* — David X Yi
*Assistant Examiner* — Alan Otto
(74) *Attorney, Agent, or Firm* — Oblon, McClelland, Maier & Neustadt, L.L.P.

(57) ABSTRACT

According to one embodiment, a memory controller controlling write to and read from a 3D NAND flash memory including a plurality of blocks, one block being constituted by a plurality of pages stacked in a depth direction includes a frame generator that generates frame data including an error detecting code or an error correcting code, and a frame divider that divides the frame data to generate a plurality of divided frames including a first divided frame and a second divided frame. The first divided frame and the second divided frame are written into different pages from one another.

11 Claims, 10 Drawing Sheets

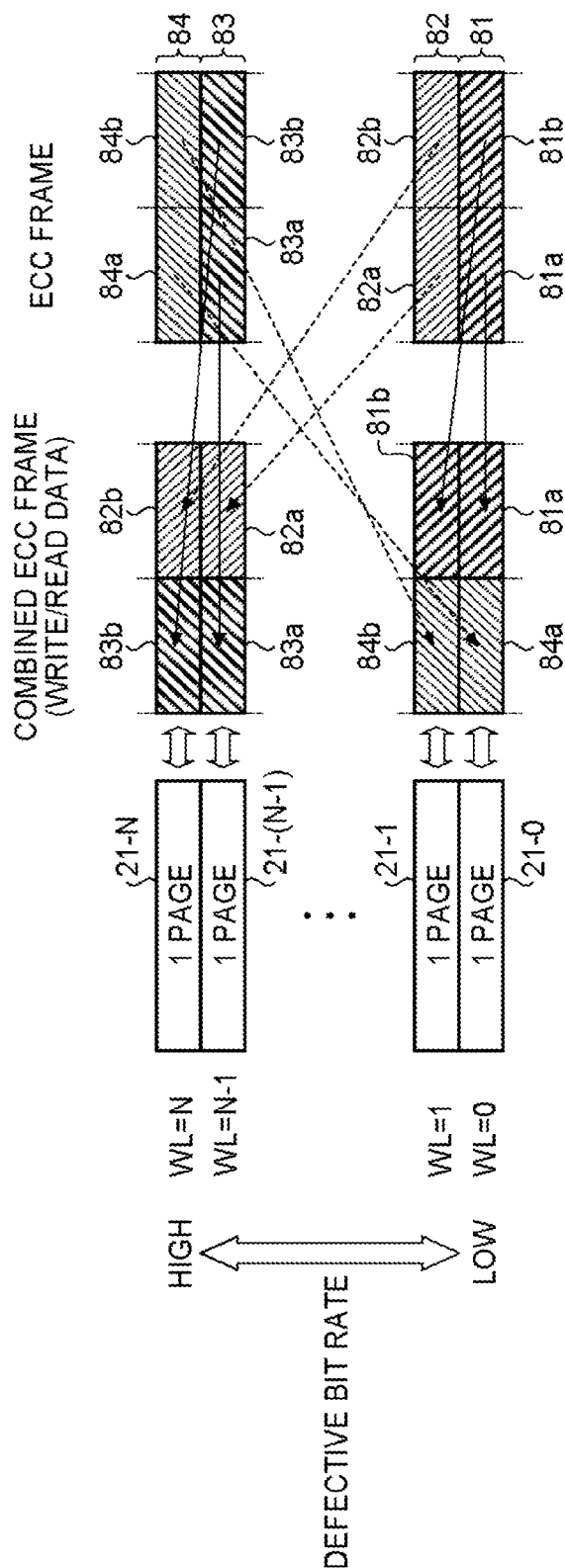

US 10,078,548 B2

MEMORY CONTROLLER, SEMICONDUCTOR DEVICE AND METHOD OF CONTROLLING SEMICONDUCTOR DEVICE

CROSS-REFERENCE TO RELATED APPLICATIONS

This application is based upon and claims the benefit of priority front U.S. Provisional Patent Application No. 62/217,348, filed on Sep. 11, 2015; the entire contents of which are incorporated herein by reference.

FIELD

Embodiments described herein relate generally to a memory controller, a semiconductor device, and a method of controlling a semiconductor device.

BACKGROUND

To provide a high capacity of a NAND flash memory, a semiconductor memory (Bit Column Stacked Memory) having three-dimensionally stacked cells has been developed in recent years. A 3D NAND flash memory (hereinafter, "3D memory") can provide a much larger capacity per chip than a semiconductor memory (hereinafter, "2D memory") having planarly arranged cells.

BRIEF DESCRIPTION OF THE DRAWINGS

FIG. 10 is an explanatory diagram of input/output of data to/from a NAND memory according to a third embodiment.

DETAILED DESCRIPTION

In general, according to one embodiment, a memory controller controls write to and read from a 3D NAND flash memory including a plurality of blocks, one block being constituted by a plurality of pages stacked in a depth direction, the memory controller comprising: a frame generator that generates frame data including an error detecting code or an error correcting code; and a frame divider that divides the frame data to generate a plurality of divided frames including a first divided frame and a second divided frame, wherein the first divided frame and the second divided frame are written into different pages from one another.

First Embodiment

First, a memory controller, a semiconductor device, and a method of controlling a semiconductor device according to a first embodiment are described in detail with reference to the drawings.

As described above, a 3D memory can provide a much larger capacity per chip than a 2D memory. However, a 3D memory has a defective mode that is unique to a 3D structure different from that of a 2D memory.

Figure 1:
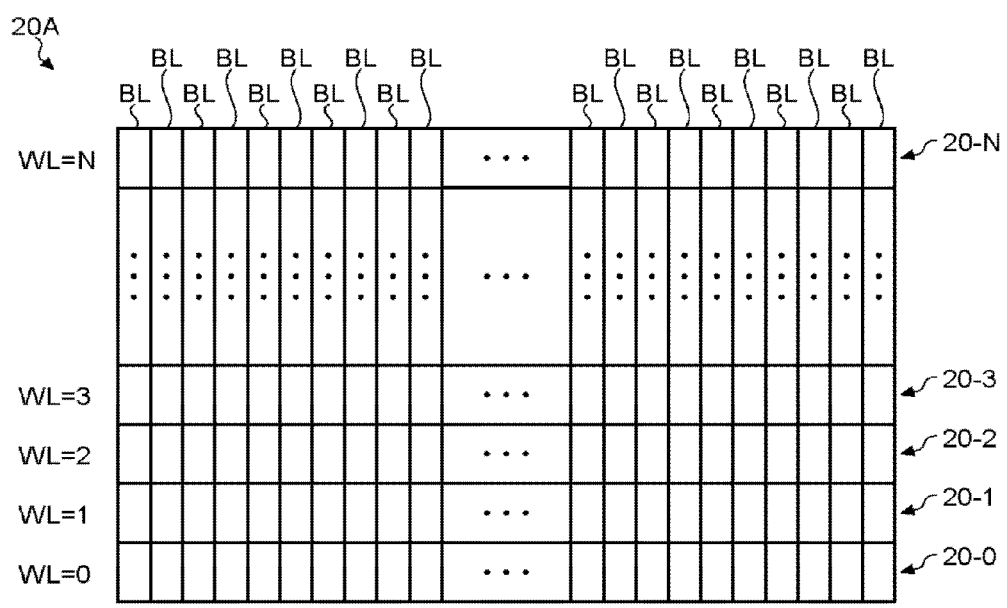
FIG. 1 is a schematic diagram illustrating a configuration example of one block in a 3D memory.

FIG. 1 is a schematic diagram illustrating a configuration example of one block in a 3D memory. As illustrated in FIG. 1, each block 20A in the 3D memory has a plurality of (N in FIG. 1) pages 20-0 to 20-N arranged in a stacking (depth) direction. The 3D memory includes a plurality of blocks 20A thus configured to provide a large capacity.

In a 3D memory having the above structure, to form bit lines BL for write (program) into/read from the pages, processing in the stacking (depth) direction is required. When there is a defect in the processing in the stacking (depth) direction, a so-called "bit-line defect" is caused and relevant bits in all pages connected to a defective hit line, become defective bits. This may increase the number of defective, bits per page.

Therefore, in the first embodiment, a memory controller and a control method that can improve an error relieving capability for pages to improve the reliability, and a semiconductor device that includes the memory controller to improve the reliability are described. However, the present invention is not limited to the embodiments.

Figure 2:
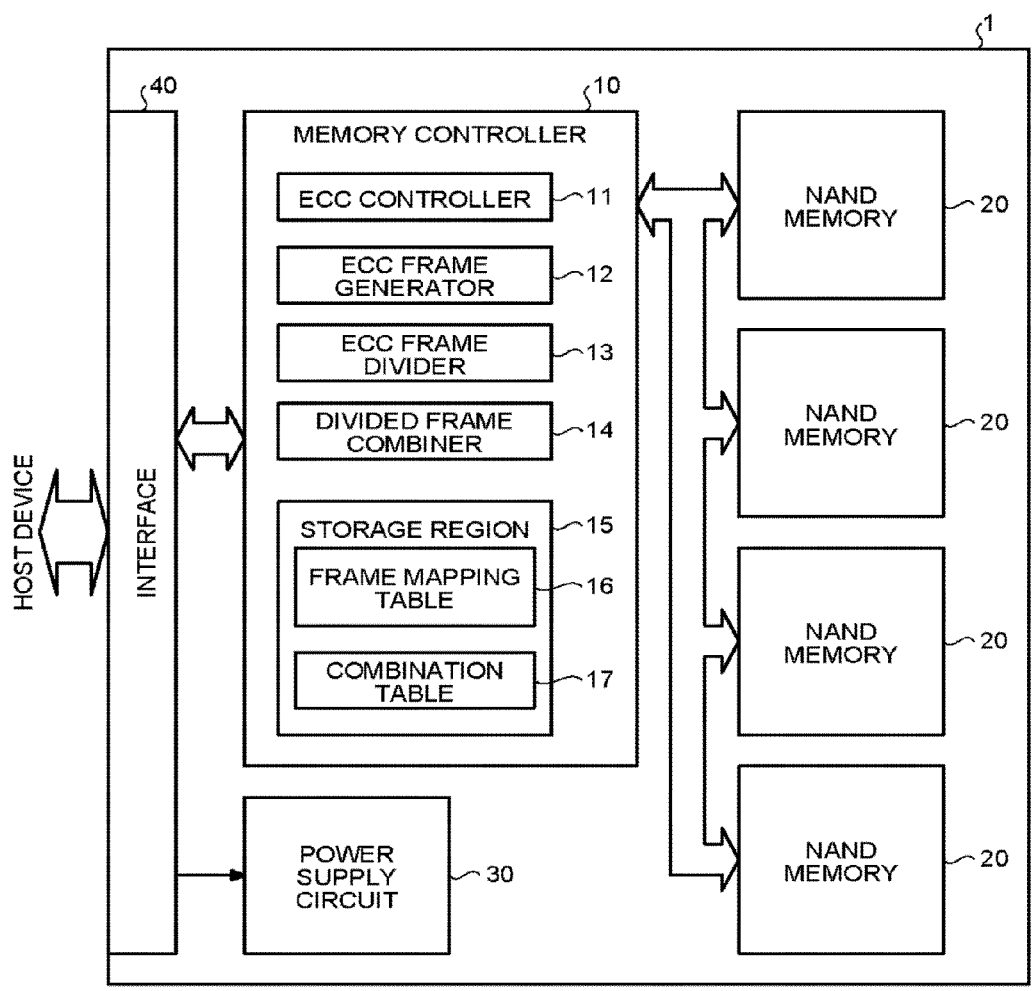
FIG. 2 is a block diagram illustrating a schematic configuration example of a semiconductor device according to a first embodiment.

FIG. 2 is a block diagram illustrating a schematic configuration example of a semiconductor device according to the first embodiment. As illustrated in FIG. 2, a semiconductor device 1 includes a memory controller 10, a plurality of NAND memories 20 that are 3D memories, a power supply circuit 30, and an interface 40. The power supply circuit 30 can alternatively be provided outside the semiconductor device 1. The semiconductor device 1 can include various sensors (for example, a temperature sensor) for stabilizing operations of the semiconductor device 1 in addition to the above components.

The interface 40 is an interface for connecting the semiconductor device 1 to a host device such as a personal computer (hereinafter, "PC") or a server, and examples of the interface 40 include a Serial ATA (hereinafter, "SATA"), a USE (Universal Serial Bus), an eMMC (Embedded MultiMedia Card), (Universal FlashStorage), and an NVMe (Non-Volatile Memory Express). The power supply circuit 30 converts power supplied from the host device via the interface 40 and supplies the converted power to the components in the semiconductor device 1.

The memory controller 10 is an information processor formed of a CPU (Central Processing Unit), an FPGA (Field-Programmable Gate Array), a dedicated chip, or the like and accesses the NAND memories 20 to write/read data in response to a request from the host device.

In the first embodiment, as constituent elements to perform operations other than the operation of accessing the NAND memories 20, the memory controller 10 includes an ECC controller 11, an ECC frame generator 12, an ECC frame divider 13, and a divided frame combiner 14.

The ECC controller 11 generates an error detecting code (hereinafter, "ECC code") such as a parity bit for user data input from the host device via the interface 40. The ECC frame generator 12 provides user data with an ECC code generated by the ECC controller 11 to generate frame data (hereinafter, "ECC frame") having a predetermined data size.

The ECC frame divider 13 divides a generated ECC frame into a predetermined number (for example, an integer equal to or larger than two) of pieces of data (hereinafter, "divided frame"). The divided frame combiner 14 combines divided frames that are segmented from different ECC frames to generate frame data (hereinafter, "combined ECC frame") having the same data size as the ECC frame.

The memory controller 10 includes a storage region 15 as a cache memory formed of an SRAM (Static Random Access Memory) or the like. When a DRAM (Dynamic Random Access Memory) is used instead of or in addition to the SRAM, the storage region 15 can be placed outside the memory controller 10.

The storage region 15 has stored therein a frame mapping table 16 and a combination table 17 as well as a program that is required for the semiconductor device 1 to operate as a storage device and that is a program for causing the memory controller 10 to perform operations including write into/read from the NAND memories 20. In addition to a correspondence relation indicating at which address in a memory space constituted by the NAND memories 25 frame data (hereinafter, also "write/read data") that is a unit for write into/read from the NAND memories 20 is stored, a correspondence relation indicating which ECC frame a divided frame, which will be described later, has been segmented from, and a correspondence relation indicating which write/read data includes a divided frame are registered in the frame mapping table 16. Therefore, the frame mapping table 16 has information about where divided frames respectively segmented from ECC frames are stored in the memory space. However, the storage region is not limited to this configuration. The storage region 15 may have stored therein a correspondence table directly indicating at which address in the memory space constituted by the NAND memories 20 a divided frame is stored. In this way, the configuration of the storage region 15 can be variously modified.

Figure 3:
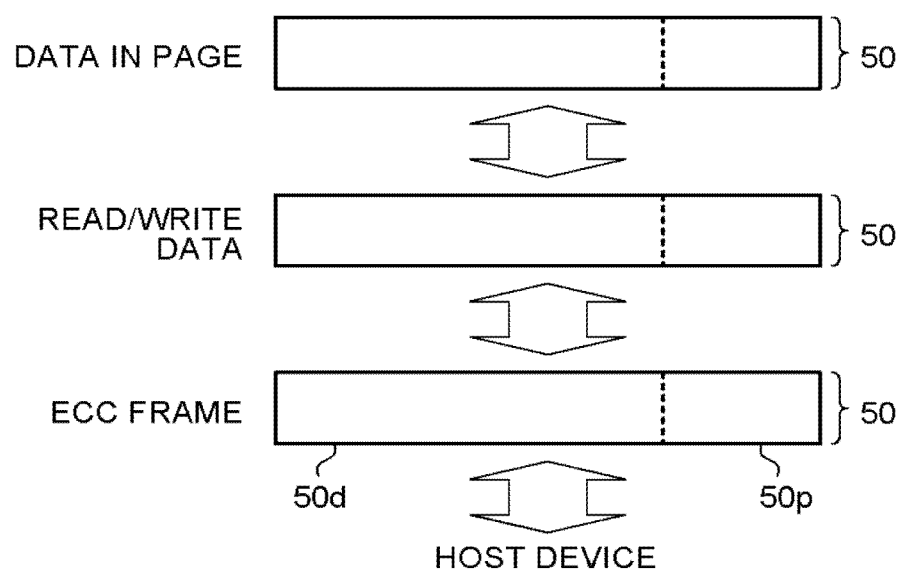
FIG. 3 is an explanatory diagram of input/output of data to/from a NAND memory when a data size of an ECC frame is equal to that of one page in the NAND memory.
Figure 4:
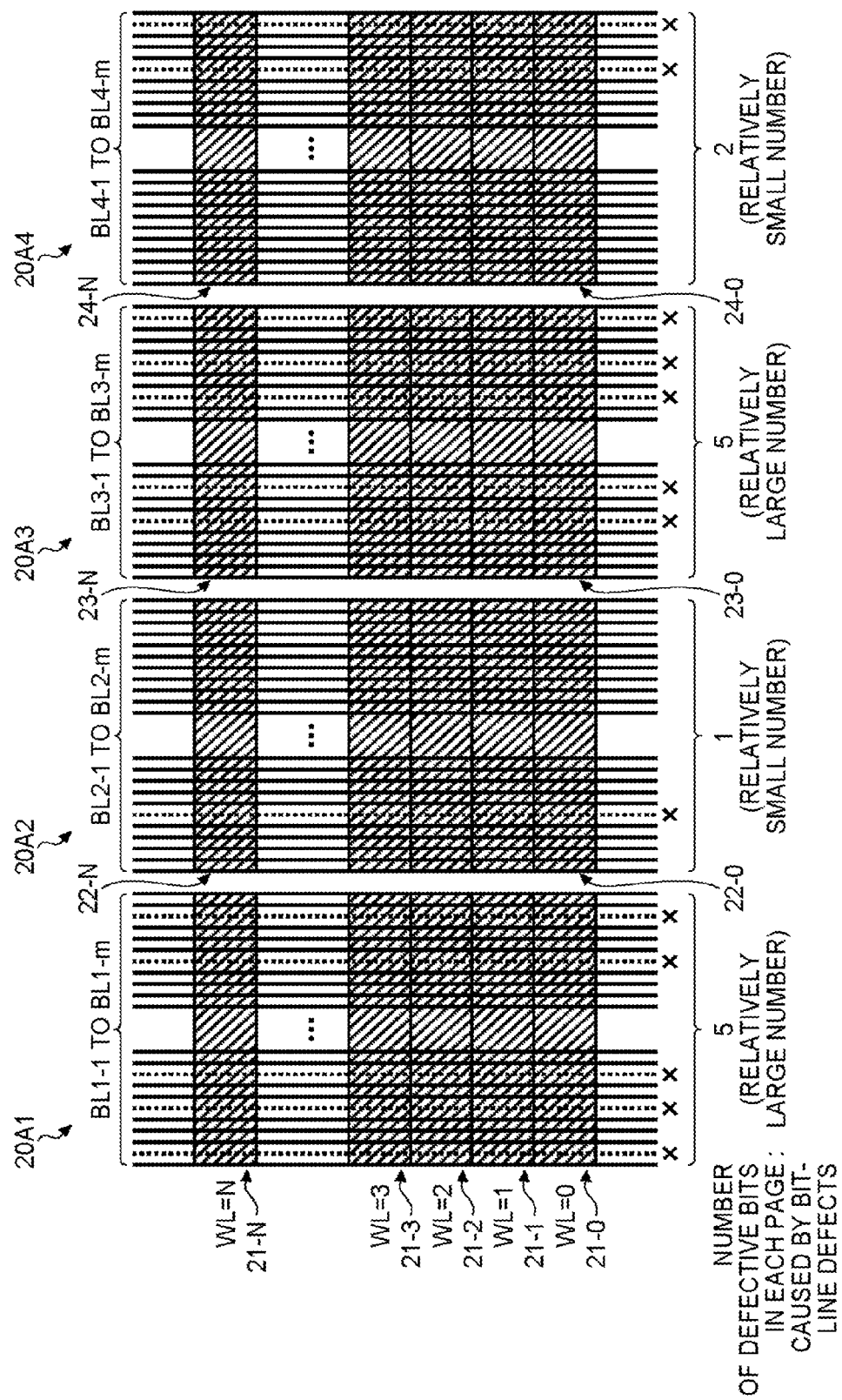
FIG. 4 is an explanatory diagram of a relation between a bit-line defect caused in a NAND memory and the numbers of defective bits included in respective pages.

A relation between frame data stored in a NAND memory and a bit-line defect caused in the NAND memory is described here. FIG. 3 is an explanatory diagram of input/output of data to/from a NAND memory when the data size of an ECC frame is equal to that of one page in the NAND memory. FIG. 4 is an explanatory diagram of a relation between a bit-line defect caused in a NAND memory and the numbers of defective bits included in respective pages.

First, as illustrated in FIG. 3, when the data size of an ECC frame 50 constituted by user data 50d and an ECC code 50p is equal to the data size of one page in the NAND memory 20, the ECC frame 50 is stored as it is as read/write data in one of the pages in the NAND memory 20. That is, when the data size of the ECC frame 50 is equal to that of one page, one ECC frame 50 is normally stored in one page without extending over a plurality of pages NAND memory 20.

Next, as illustrated in FIG. 4, in the NAND memory 20 having a 3D structure, an occurrence frequency of Lit-line defects differs by block. In the example illustrated in FIG. 4, a larger number of bit-line defects are included in blocks 20A1 and 20A3 and a smaller number of bit-line defects are included in blocks 20A2 and 20A4. In this case, pages 22-0 to 22-N or 24-0 to 24-N included in the block 20A2 or 20A4 having a smaller number of bit-line defects include relatively few defective bits caused by the bit-line defects. Therefore, the total number of defective bits including defective bits caused by other factors is relatively small. On the other hand, pages 21-0 to 21-N or 23-0 to 23-N included in the block 20A1 or 20A3 having a larger number of bit-line defects include a relatively large number of defective bits caused by the bit-line defects. Therefore, the total number of defective bits including defective bits caused by other factors is increased.

The above state may cause a state where the ECC frame 50 that is written into the pages 21-0 to 21-N or 23-0 to 23-N including a relatively large number of defective bits caused by the bit-line defects includes a large number of bit defects beyond the error detecting capability of the ECC code 50p. In this case, it is difficult to relieve the ECC frame 50. Accordingly, there is a possibility that the operation reliability of the semiconductor device 1 decreases.

Therefore, in the first embodiment, to prevent unbalance in caused bit-line defects among blocks from causing difficulty in relieving ECC frames by error detection, one ECC frame 50 is divided into a plurality of divided frames and the divided frames are stored in different pages, respectively. According to this configuration, because unbalanced numbers of bit-line defects among blocks are leveled for ECC frames, it is possible to increase the possibility that the ECC frames are relieved by error detection.

Furthermore, in the first embodiment, a plurality of (two in the first embodiment) pages as a storage destination for a plurality of (two in the first embodiment) divided frames generated from one ECC frame include both a page including a relatively large number of defective bits caused by bit-line defects and a page including a relatively small number of defective bits caused by bit-line defects. Thereby, unbalanced bit-line defects among blocks can be leveled more for ECC frames so that the capability of relieving the ECC frames by error detection can be enhanced more. A combination of a page including a relatively large number of defective hits caused by bit-line defects and a page including a relatively small number of defective bits caused by bit-line defects is registered in the combination table 17 stored in the storage region 15, for example.

Figure 5:
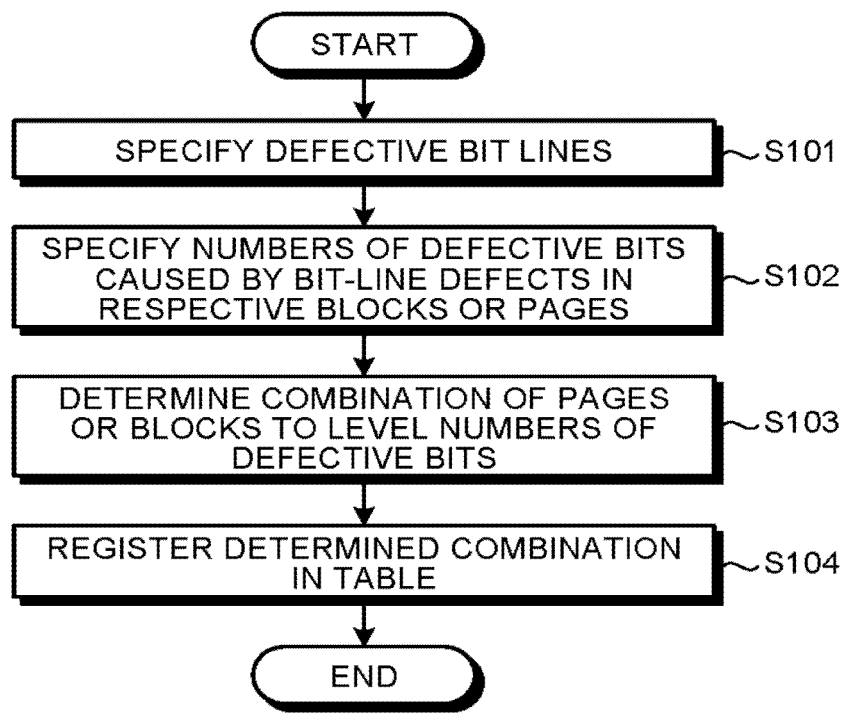
FIG. 5 is a flowchart schematically illustrating an operation in creating a combination table according to the first embodiment.
Figure 6:
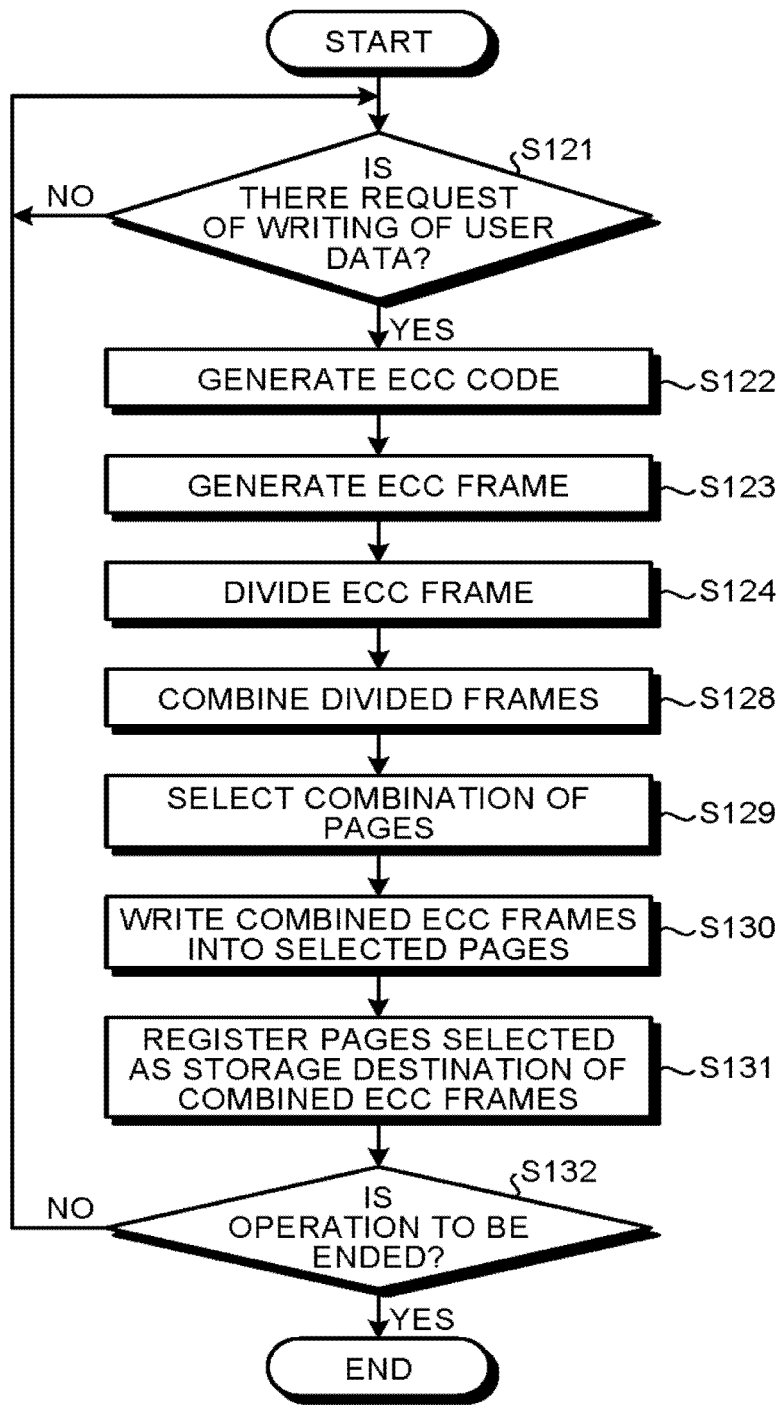
FIG. 6 is a flowchart schematically illustrating a writing operation of a memory controller according to the first embodiment.
Figure 7:
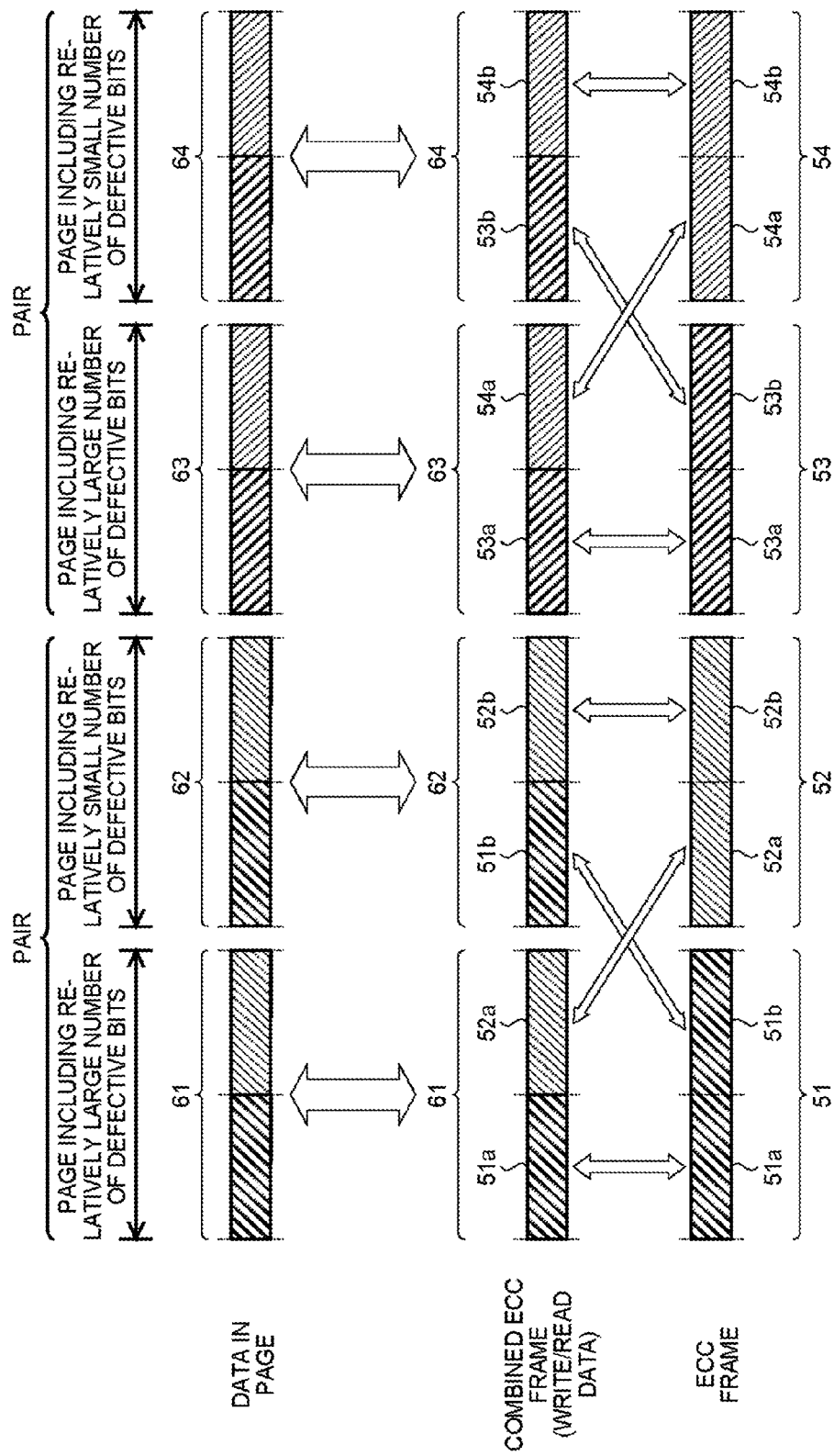
FIG. 7 is an explanatory diagram of input/output of data to/from a NAND memory according to the first embodiment.
Figure 8:
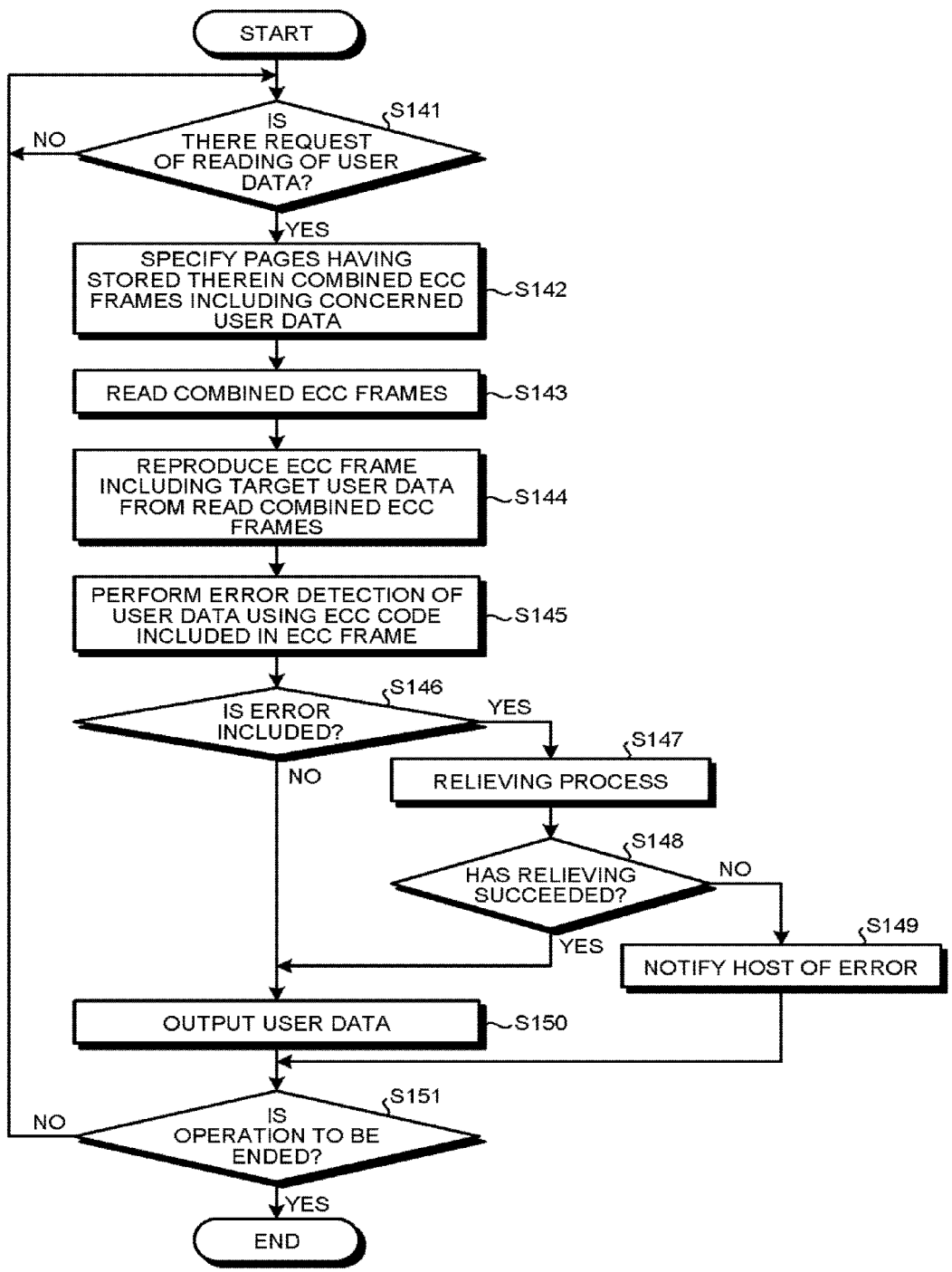
FIG. 8 is a flowchart schematically illustrating a reading operation of the memory controller according to the first embodiment.

Operations of the memory controller 10 according to the first embodiment are described next below in detail with reference to the drawings. FIG. 5 is a flowchart schematically illustrating an operation in creating a combination table according to the first embodiment. FIG. 6 is a flowchart schematically illustrating a writing operation of the memory controller according to the first embodiment. FIG. 7 is a diagram for additionally describing the operation of the memory controller illustrated in FIG. 6 and is an explanatory diagram of input/output of data to/from the NAND memory according to the first embodiment. FIG. 8 is a flowchart, schematically illustrating a reading operation of the memory controller according to the first embodiment.

For example, the operation illustrated in FIG. 5 can be performed before shipment of the semiconductor device 1 or can be performed every time the semiconductor device 1 is powered on or every time a block is deleted from the NAND memories 20. When the operation is performed every time the semiconductor device 1 is powered on or every time a block is deleted, the configuration of an ECC frame can be dynamically switched.

As illustrated in FIG. 5, in the present operation, the memory controller 10 first performs verification of the NAND memories 20 to specify positions of defective bit lines (Step S101), and subsequently specifies the numbers of defective bit lines included in blocks or pages, respectively (Step S102). Next, the memory controller 10 determines a combination of pages or blocks so as to level the numbers of total defective bit lines in the combined blocks or pages (Step S103). For example, the combination of pages or blocks can be determined so as to cause the number of defective bit lines to be close to an average value of the numbers of defective bit lines in units of pages, which is calculated in advance. At that time, the combination of pages or blocks can be determined in consideration of the write/read performance (for example, a write/read speed). Thereafter, the memory controller 10 registers the determined combination in the combination table 17 in the storage region 15 (Step S104) and ends the present operation.

As illustrated in FIG. 6, in the writing operation to the NAND memory 20, the memory controller 10 first waits a request of writing of user data from the device (NO at Step 121). When the memory controller 10 receives a request of writing (YES at Step S121), the memory controller 10 inputs the received user data to the ECC controller 11 and generates an ECC code (Step S122). At that time, when a plurality of ECC frames (four ECC frames 51 to 54 in the example in FIG. 7) are generated from the input user data, the memory controller 10 generates ECC codes for the respective ECC frames.

Next, the memory controller 10 inputs the user data and the ECC code into the ECC frame generator 12 and generates one or more ECC frames (Step S123), subsequently inputs the generated ECC frames into the ECC frame divider 13, and divides the ECC frames respectively into a predetermined number (two in the first embodiment) of divided frames (Step S124). In the example illustrated in FIG. 7, the four ECC frames 51 to 54 are generated from user data and the ECC frames 51 to 54 are divided into divided frames 51a and 51b, 52a and 52b, 53a and 53b, and 54a and 54b, respectively. At that time, the memory controller 10 holds which divided frame is segmented from which ECC frame.

Next, the memory controller 10 inputs the generated divided frames into the divided frame combiner 14 and combines the divided frames by a predetermined number (two in the first embodiment) to generate combined ECC frames (Step S128). In a method of combining the divided frames, it suffices that divided frames segmented from the same EC use are not combined. Preferably, a number (two in the first embodiment) of ECC frames same as the number (the same number as the number of divided frames segmented from one ECC frame) of pages in each combination registered in the combination table 17 are combined and divided frames of the combined ECC frames are combined. At that time, when the number of generated ECC frames is lower than the number of pages in each combination, a necessary number of combined ECC frames can be created by various methods such as method of using one ECC frame (or one divided frame) multiple times. According to such a method, it can be avoided that divided frames segmented from the same ECC frame are written together into a page with a large number of defective bit lines. In the example illustrated in FIG. 7, the divided frames 51a and 52a, 51b and 52b, 53a and 54a, an 53b and 54b are combined, respectively, an that combined ECC frames 61 to 64 are generated. The memory controller 10 holds which divided frame is included in which combined ECC frame.

Next, the memory controller 10 selects a page combination from the combination table 17 in such a way that pages as many as the combined ECC frames are selected (Step S129) and writes the combined ECC frames into the respective selected pages successively (Step S130). At that time, combined ECC frames constituted by divided frames segmented from combined ECC frames are written into the combined pages, respectively. Consequently, it can be avoided that divided frames segmented from the same ECC frame are written together into a page with a large number of defective bit lines. In the example illustrated in FIG. 7, the combined ECC frames 61 and 62 constituted by the divided frames 51a and 52a and the divided frames 51b and 52b segmented from the ECC frames 51 and 52, respectively, are written into respective pages constituting a combination registered in the combination table 17, and the combined ECC frames 63 and 64 constituted by the divided frames 53a and 54a and the divided frames 53b and 54b segmented from the ECC frames 53 and 54, respectively, are written into respective pages constituting a combination registered in the combination table 17.

Next, the memory controller 10 registers which combined ECC frame is stored in which page (an address in the memory space) of the NAND memories 20 in the frame mapping table 16 (Step S131). At that time, the memory controller 10 registers information about which divided frame is segmented from which ECC frame and information about which divided frame is included in which combined ECC frame together. Accordingly, the memory controller 10 can cause the frame mapping table 16 to hold information about which ECC frame a divided frame is segmented from and where the divided frame is stored in the memory space constituted by the NAND memories 20.

Thereafter, the memory controller 10 determines whether to end the present operation (Step S132). When the memory controller 10 determines to end the present operation (YES at Step S132), the memory controller 10 ends the present operation. When the memory controller 10 determines not to end the present operation (NO at Step S132), the memory controller 10 returns to Step S121 to perform the succeeding processes.

As illustrated in FIG. 8, in the reading operation from the NAND memory 20, the memory controller 10 first waits a request of reading of user data from the host device (NO at Step S141). When the memory controller 10 receives a request of reading (YES at Step S141), the memory controller 10 refers to the frame mapping table to specify pages having stored therein combined ECC frames including the requested user data (Step S142), and reads the combined ECC frames stored in the specified pages (Step S143). An ECC frame including the requested user data has been divided and stored in a plurality of (two in the first embodiment) pages. Accordingly, the memory controller 10 reads the combined ECC frames respectively from the two pages.

Next, the memory controller 10 segments divided frames including the user data from the read combined ECC frames and combines the divided frames to reproduce the ECC frame including the target user data (Step S144), and performs error detection of the user data using an ECC code included in the reproduced ECC frame (Step S145).

Next, the memory controller 10 determines whether an error is included in the user data n a result of the error detection at Step S145 (Step S146). When no error is included (NO at Step S146), the memory controller 10 proceeds to Step S150. When an error is included (YES at Step S146), the memory controller 10 performs a predetermined relieving process such as error correction (Step S147) and determines whether the relieving such as error correction has succeeded (Step S148). When the relieving has succeeded (YES at Step S150), the memory controller 10 proceeds to Step S150. When the relieving has not succeeded (NO at Step S146), the memory controller 10 notifies the host device of an error (Step S149) and proceeds to Step S151.

At Step S150, the memory controller 10 outputs the reproduced user data or the relieved user data to the host device. At Step S151, the memory controller 10 determines whether to end the present operation. When the memory controller 10 determines to end the present operation (YES at Step S151), the memory control ends the present operation. When the memory controller 10 determines not to end the present operation (NO at Step S151), the memory controller 10 returns to Step S141 and performs the succeeding processes.

As described above, according to the first embodiment, one ECC frame is divided into plural divided frames and the divided frames can be stored in different pages, respectively. Thereby, unbalanced bit-line defects among blocks are leveled for ECC frames. Therefore, it is possible to increase the possibility that the ECC frames can be relieved by error detection.

Second Embodiment

Next, a memory controller, a semiconductor device, and a method of controlling a semiconductor device according to a second embodiment are described in detail with reference to the drawings. In the following descriptions, constituent elements identical to those of the first embodiment are denoted by like reference signs, and redundant descriptions thereof will be omitted.

In the above first embodiment, an example in which the data size of each ECC frame (a combined ECC frame) is equal to that of one page has been described. In contrast, in the second embodiment, an example in which a plurality of (two in an example described below) ECC frames constitute data of one page, in other words, the data size of each page is a multiple of the data size of an ECC frame will be described.

Figure 9:
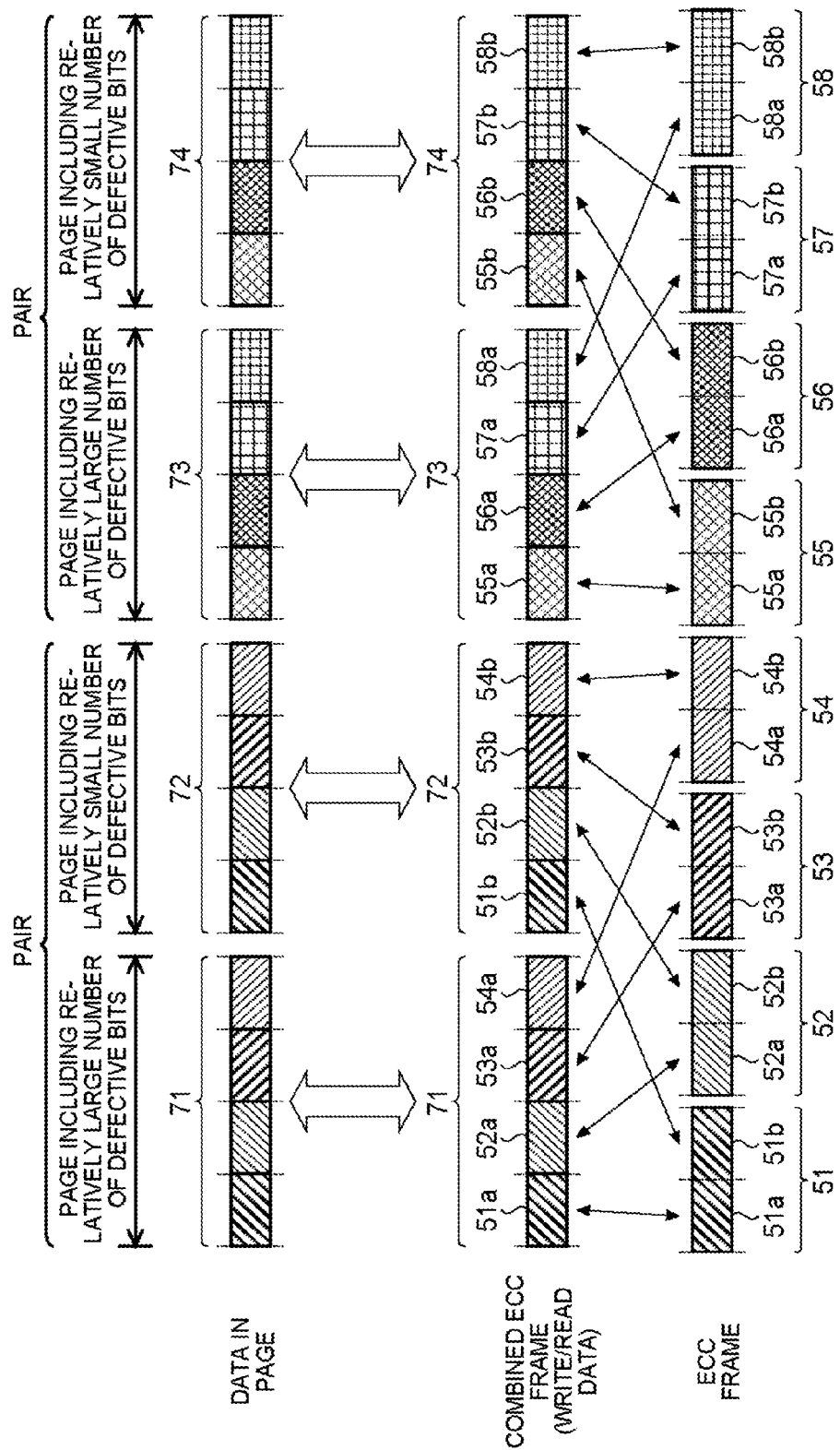
FIG. 9 is an explanatory diagram of input/output of data to/from a NAND memory according to a second embodiment.

FIG. 9 is an explanatory diagram of input/output of data to/from a NAND memory according to the second embodiment. As illustrated in FIG. 9, even in a case where the data size of one page is equal to the data size of two ECC frames, ECC frames 51 to 58 are respectively divided into two when the number of pages in each combination registered in the combination table 17 is two. However, combined ECC frames 71 to 74 that are write/read data are generated by combining divided frames the number (four) of which is obtained by multiplying the number (two) of ECC frames corresponding to the data size of one page by the number (two) of pages in each combination. For example, the combined ECC frame 71 is generated by combining the four divided frames 51a, 52a, 53a, and 54a.

A configuration of a semiconductor device using such combined ECC frames as write/read data can be identical to that of the semiconductor device 1 having been described with reference to FIG. 2 in the first embodiment. Operations of the memory controller 10 according to the second embodiment can be identical to respective operations described with reference to FIGS. 5, 6, and 8. However, in the second embodiment, at Step S128 in FIG. 6, divided frames the number of which is obtained by multiplying the number of ECC frames corresponding to the data size of one page by the number of pages in each combination are combined to generate a combined ECC frame.

As described above, according to the second embodiment, also when plural ECC frames constitute data of one page, one ECC frame is divided into plural divided frames and the divided frames can be stored in different pages, respectively. Thereby, unbalanced bit-line defects among blocks are leveled for ECC frames. Therefore, it is possible to increase the possibility that the ECC frames can be relieved by error detection. Other configurations, operations, and effects of the second embodiment are identical to those described in the first embodiment, and thus detailed descriptions thereof are omitted.

Third Embodiment

Next, a memory controller, a semiconductor device, and a method of controlling a semiconductor device according to a third embodiment are described in detail with reference to the drawings. In the following descriptions, constituent elements identical to those of the first or second embodiment are denoted by like reference signs, and redundant descriptions thereof will be omitted.

In the above first or second embodiment, pages in the direction of word lines WL, that is, divided frames are exchanged among blocks to level unbalanced bit-line defects for ECC frames. In contrast, in the third embodiment, divided frames are exchanged among pages in the direction of bit lines BL, that is, in a block.

FIG. 10 is an explanatory diagram of input/output of data to/from a NAND memory according to the third embodiment. As described above, pages are stacked in the stacking (depth) direction in the NAND memory 20 having a 3D structure. For this reason, a layer having a relatively large number of defective bits and a layer having a relatively small number of defective bits may be generated depending on the processing accuracy in forming the layers. As illustrated in FIG. 10, for example, upper-layer pages (for example, pages 21-(N-1) and 21-N) that are formed after lower-layer pages (for example, pages 21-0 and 21-1) in a production process are likely to include more defective bits than the lower-layer pages (the pages 21-0 and 21-1) that are formed earlier. Therefore, in the third embodiment, divided frames are exchanged among pages in the direction of bit lines BL, that is, in a block so that unbalanced numbers of defective bits among layers are leveled for ECC frames.

A schematic configuration of the semiconductor device according to the third embodiment can be identical to that of the semiconductor device 1 described in the first embodiment with reference to FIG. 2. Further, operations of the memory controller 10 according to the third embodiment can be identical to respective operations described with reference to FIGS. 5, 6, and 8.

In the third embodiment, a combination of pages registered in the combination table 17 is a combination of pages in the direction of the bit lines BL. Pages to be combined can be selected at random or can be selected based on a predetermined rule. For example, when the number of layers in a page in the direction of the bit lines BL is N and the number of pages to be combined is two, pages of each combination can be selected in such a way that the n-th (n is an integer not smaller than 0 and not larger than N) page from the lowest layer and the (N-n)th page from the lowest layer are combined. In this case, it is possible to combine an upper-layer page that is relatively highly likely to include defective bits and a lower-layer page that is relatively less likely to include defective bits. Accordingly, unbalanced numbers of defective bits can be leveled more for ECC frames.

As described above, according to the third embodiment, one ECC frame is divided into plural divided frames and the divided frames can be stored in different pages arranged in the direction of the bit lines BL, respectively. Thereby, unbalanced numbers of defective bits among pages are leveled for ECC frames. Therefore, it is possible to increase the possibility that the ECC frames can be relieved by error detection. Other configurations, operations, and effects of the third embodiment are identical to those described in the first or second embodiment, and thus detailed descriptions thereof will be omitted.

While an error detecting code (ECC) such as a parity bit is used to generate an ECC frame in the above first to third embodiments, the present invention is not limited thereto. For example, an error correcting code such as a BCH code can be used instead of the error detecting code (ECC).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory controller controlling write to and read from a 3D NAND flash memory including a plurality of blocks, one block being constituted by a plurality of pages stacked in a depth direction, the memory controller comprising:
   a frame generator that generates first frame data and second frame data each of which includes an error correcting code (ECC); and
   a frame divider that divides the first frame data to generate a plurality of divided frames including a first divided frame and a second divided frame and divides the second frame data to generate a plurality of divided frames including a third divided frame and a fourth divided frame, wherein
   the memory controller:
      performs verification of the 3D NAND flash memory to specify the number of defective bit lines included in each block;
      determines combinations of pages based on the specified number of defective bit lines included in each block so that the numbers of total defective bit lines in the respective combinations of pages are leveled, the combinations of pages including a first combination which includes a first page and a second page;
      combines the first divided frame and the third divided frame to generate a first ECC frame and combines the second divided frame and the fourth divided frame to generate a second ECC frame; and
      allocates the first and second ECC frames to the first combination so that the first ECC frame is written into the first page and the second ECC frame is written into the second page.

2. The memory controller according to claim 1, further comprising a storage region that has stored therein information about the determined combinations of pages, wherein
   when the memory controller writes the first and second ECC frames to the 3D NAND flash memory, the memory controller selects the first combination including the first and second page from the storage region.

3. The memory controller according to claim 1, wherein a data size of respective pages is equal to a data size of the first frame data as well as a data size of the second frame data.

4. The memory controller according to claim 1, wherein a data size of respective pages is a multiple of a data size of the first frame data as well as a multiple of a data size of the second frame data.

5. A semiconductor device comprising:
   the memory controller according to claim 1, and
   one or more 3D NAND flash memories, each of the 3D NAND flash memories including a plurality of blocks, one block being constituted by a plurality of pages.

6. The memory controller according to claim 1, wherein the memory controller calculates an average value of the number of defective bit lines per page and determines the combinations of pages so that the numbers of total defective bit lines per page in the respective combinations of pages are close to the average value.

7. The memory controller according to claim 1, wherein a data size of the first and second ECC frames is the same as a data size of the first and second frame data.

8. The memory controller according to claim 1, wherein the plurality of blocks include a first block and a second block, the second block being different from the first block,
   the first page belongs to the first block, and
   the second page belongs to the second block.

9. The memory controller according to claim 8, wherein the 3D NAND flash memory includes a plurality of word lines to which a plurality of memory cells are connected, respectively,
   a plurality of memory cells connected to the same word line constitute one page among the plurality of pages, and
   the first block and the second block are arranged in a direction of the word lines.

10. The memory controller according to claim 1, wherein the first page and the second page belong to an identical block, and
    a depth position of the first page differs from a depth position of the second page in the depth direction.

11. A method of controlling write to and read from a 3D NAND flash memory including a plurality of blocks, one block being constituted by a plurality of pages stacked in a depth direction, the method comprising:
    generating first and second frame data each of which includes an error correcting code (ECC), respectively;
    dividing the first frame data, thereby generating a plurality of divided frames including a first divided frame and a second divided frame, and dividing the second frame data, thereby generating a plurality of divided frames including a third divided frame and a fourth divided frame;
    performing verification of the 3D NAND flash memory, thereby specifying the number of defective bit lines included in each block;
    determining combinations of pages based on the specified number of defective bit lines included in each block so that the numbers of total defective bit lines in the respective combinations of pages are leveled, the combinations of pages including a first combination which includes a first page and a second page;
    combining the first divided frame and the third divided frame, thereby generating a first ECC frame, and combining the second divided frame and the fourth divided frame, thereby generating a second ECC frame; and allocating the first and second ECC frames to the first combination so that the first ECC frame is written into the first page and the second ECC frame is written into the second page.

* * * * *